United States Patent
Kuzumoto et al.

(10) Patent No.: US 9,803,137 B2
(45) Date of Patent: Oct. 31, 2017

(54) SEMICONDUCTOR PHOSPHOR NANOPARTICLE AND LIGHT-EMITTING ELEMENT INCLUDING SEMICONDUCTOR PHOSPHOR NANOPARTICLE

(71) Applicant: Sharp Kabushiki Kaisha, Osaka-shi, Osaka (JP)

(72) Inventors: Yasutaka Kuzumoto, Osaka (JP); Tatsuya Ryohwa, Osaka (JP); Mami Morishita, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 165 days.

(21) Appl. No.: 14/844,366

(22) Filed: Sep. 3, 2015

(65) Prior Publication Data
US 2016/0115383 A1 Apr. 28, 2016

(30) Foreign Application Priority Data
Oct. 24, 2014 (JP) ................. 2014-217175

(51) Int. Cl.
| C09K 11/08 | (2006.01) |
| C09K 11/70 | (2006.01) |
| C09K 11/02 | (2006.01) |
| C09K 11/62 | (2006.01) |

(52) U.S. Cl.
CPC .......... *C09K 11/703* (2013.01); *C09K 11/025* (2013.01); *C09K 11/623* (2013.01)

(58) Field of Classification Search
CPC .... C09K 11/703; C09K 11/025; C09K 11/623
See application file for complete search history.

(56) References Cited

U.S. PATENT DOCUMENTS 8,334,527 B2 * 12/2012 Iizumi .................. B82Y 20/00
257/13
2009/0315446 A1 12/2009 Murase et al.

FOREIGN PATENT DOCUMENTS

| JP | 2010-138367 A | 6/2010 |
| WO | WO 2014/046307 | * 3/2014 |

* cited by examiner

*Primary Examiner* — Carol M Koslow
(74) *Attorney, Agent, or Firm* — Keating & Bennett, LLP

(57) ABSTRACT

A semiconductor phosphor nanoparticle includes a semiconductor nanoparticle core containing a compound semiconductor, a shell layer coating the semiconductor nanoparticle core, and a modifying organic compound bonded to the shell layer through siloxane bonding. The modifying organic compound has an alkyl chain.

10 Claims, 3 Drawing Sheets

Fig. 6           PRIOR ART

SEMICONDUCTOR PHOSPHOR NANOPARTICLE AND LIGHT-EMITTING ELEMENT INCLUDING SEMICONDUCTOR PHOSPHOR NANOPARTICLE

BACKGROUND

1. Field

The present disclosure relates to a semiconductor phosphor nanoparticle and a light-emitting element including a semiconductor phosphor nanoparticle.

2. Description of the Related Art

Semiconductor nanoparticles are known to exhibit a quantum size effect when their size is reduced to about exciton Bohr radius. A quantum size effect is a phenomenon associated with a decrease in size of a substance in which electrons in the substance can no longer move freely and can only assume a specific energy value rather than an arbitrary value. It is also known that changes in the size of a semiconductor nanoparticle that confines electrons change the energy state of the electrons and that the wavelength of light generated from a semiconductor nanoparticle becomes shorter as the particle size decreases. Semiconductor nanoparticles that exhibit such a quantum size effect have been a subject of much focus for use as phosphors, and studies are being made thereon Semiconductor nanoparticles have an average particle size of 100 nm or less and high surface activity, and thus aggregate easily. When semiconductor nanoparticles are used as phosphors, aggregation of semiconductor nanoparticles adversely affects luminous efficiency of phosphors. In order to suppress aggregation, a technique of modifying surfaces of semiconductor nanoparticles with a protective agent has been proposed.

Japanese Unexamined Patent Application Publication No. 2010-138367 discloses a technique of modifying nanoparticle surfaces with a modifying agent having a thiol group so as to obtain semiconductor phosphor nanoparticles with high water dispersibility.

In making a device by using semiconductor phosphor nanoparticles, modified semiconductor phosphor nanoparticles are encapsulated in a resin or glass. In the case where semiconductor phosphor nanoparticles are encapsulated in glass by using an organoalkoxysilane such as tetraethyl orthosilicate (TEOS) or encapsulated in a resin by using a polymer material, luminous efficiency of the semiconductor phosphor nanoparticles is decreased.

This is probably due to the following reason. After semiconductor phosphor nanoparticles are dispersed in an organoalkoxysilane, stress is generated by condensation reaction that occurs by vitrification of the organoalkoxysilane, and causes dissociation of bonds between thiol modifying groups and surfaces of phosphor nanoparticles, thereby inducing defects in the surfaces of semiconductor phosphor nanoparticles.

SUMMARY

It is desirable to provide semiconductor phosphor nanoparticles that are easily dispersible in a polymer material or a glass material and can maintain good luminous efficiency even after curing of the polymer material or vitrification of the glass material, and a light-emitting element that contains the semiconductor phosphor nanoparticles.

According to an aspect of the disclosure, there is provided a semiconductor phosphor nanoparticle that includes a semiconductor nanoparticle core containing a compound semiconductor, a shell layer coating the semiconductor nanoparticle core, and a modifying organic compound that bonds to the shell layer through siloxane bonding, the modifying organic compound having an alkyl chain.

According to another aspect of the disclosure, there is provided a light-emitting element containing the semiconductor phosphor nanoparticle.

BRIEF DESCRIPTION OF THE DRAWINGS

FIG. 6 is a diagram illustrating an example of bonding between a shell layer and a modifying organic compound in a semiconductor phosphor nanoparticle of related art.

DESCRIPTION OF THE EMBODIMENTS

Figure 1:
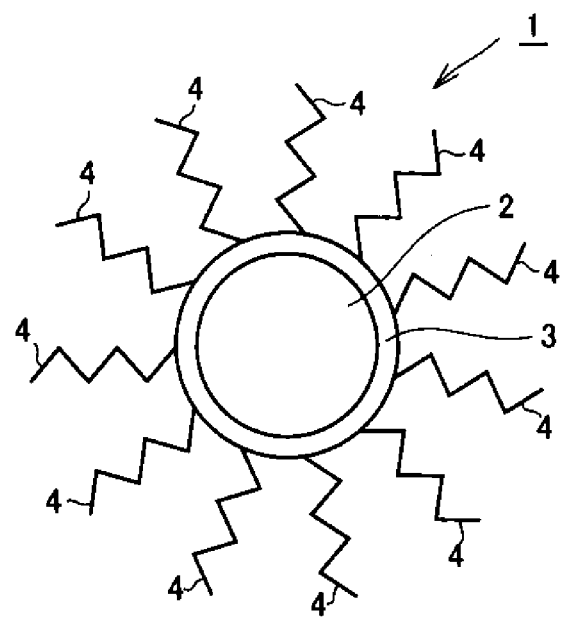
FIG. 1 is a diagram illustrating a semiconductor phosphor nanoparticle according to an embodiment of the present disclosure.

In the drawings of this disclosure, the same reference signs are used to denote the same or equivalent parts. The dimensions such as a length, a magnitude, a width, etc., in the drawings are altered to clarify and simplify the drawings, and thus do not represent actual dimensions.

First Embodiment

A semiconductor phosphor nanoparticle according to an embodiment of the present disclosure will now be described with reference to FIGS. 1 to 3.

As illustrated in FIG. 1, a semiconductor phosphor nanoparticle 1 includes a semiconductor nanoparticle core 2, a shell layer 3 coating the semiconductor nanoparticle core 2, and modifying organic compounds 4 that bond to the shell layer 3 through siloxane bonding.

Semiconductor Nanoparticle Core

The semiconductor nanoparticle core 2 is composed of a semiconductor. The semiconductor nanoparticle core 2 may contain a group 13-15 semiconductor. Examples of the composition of the semiconductor constituting the semiconductor nanoparticle core 2 include InN, InP, InGaN, InGaP, AlInN, AlInP, AlGaInN, AlGaInP, CdS, CdSe, CdTe, CdZnS, CdZnSe, CdZnTe, CdZnSSe, and CdZnSeTe. A semiconductor having such a composition has a band gap energy that generates visible luminescence with a wavelength of 380 nm to 780 nm. A semiconductor nanoparticle core capable of generating desired visible luminescence can be formed by controlling the size and the mixed crystal ratio of the semiconductor nanoparticle.

The semiconductor constituting the semiconductor nanoparticle core 2 may be InN or InP. InN and InP are easy to prepare since fewer materials are used in preparation, and exhibit a high quantum yield. Moreover, InN and InP exhibit high luminous efficiency when irradiated with light from a light-emitting diode (LED). A quantum yield refers to a ratio of the number of photons emitted through fluorescence to the number of photons absorbed.

The semiconductor nanoparticle core 2 may also contain unintentional impurities. At least one selected from group 2 elements (Be, Mg, Ca, Sr, and Ba), Zn, and Si may be intentionally added as a dopant as long as the concentration thereof is low. The dopant concentration range may be in the range of $1 \times 10^{16}$ cm$^{-3}$ to $1 \times 10^{21}$ cm$^{-3}$. The dopant may be Mg, Zn, or Si.

Shell Layer

The shell layer 3 is composed of a compound semiconductor inheriting the crystal structure of the semiconductor nanoparticle core 2. The shell layer 3 is a layer formed by growth of semiconductor crystals on a surface of the semiconductor nanoparticle core 2. The semiconductor nanoparticle core 2 is bonded to the shell layer 3 through chemical bonds. The shell layer 3 may contain a group 13-15 semiconductor. The shell layer 3 may be composed of, for example, at least one material selected from the group consisting of GaAs, GaP, GaN, GaSb, InAs, InP, InN, InSb, AlAs, AlP, AlSb, AlN, ZnO, ZnS, ZnSe, ZnTe, CdS, CdSe, CdTe, CdZnS, CdZnSe, CdZnTe, CdZnSSe, and CdZnSeTe. The thickness of the shell layer 3 may be about 0.1 nm to about 10 nm.

Modifying Organic Compounds

The modifying organic compounds 4 are each an organic compound that strongly bonds to the shell layer 3 through siloxane bonding. The surface of the shell layer 3 has dangling bonds. Since the modifying organic compounds 4 cap the dangling bonds, surface defects in the shell layer 3 are suppressed and the luminous efficiency of the semiconductor nanoparticle core 2 is improved. Moreover, a modifying organic compound layer formed by the modifying organic compounds 4 can suppress aggregation of semiconductor phosphor nanoparticles 1. As a result, the semiconductor phosphor nanoparticles 1 can be more easily dispersed in a glass material, a polymer material, or the like. During vitrification or resinification conducted after the phosphor nanoparticles are dispersed in a glass material or a polymer material, separation of the modifying organic compounds 4 from the surface of the shell layer 3 caused by stress generated by condensation reaction of the glass material or the polymer material is suppressed, defects do not occur in the surface of the shell layer 3, and thus the decrease in luminous efficiency of the semiconductor phosphor nanoparticles 1 can be suppressed.

Each modifying organic compound 4 constituting the modifying organic compound layer may contain a silyl-based functional group that can strongly bond to the shell layer 3. Examples of the silyl-based functional group include alkoxysilyl groups such as a monomethoxysilyl group, a monoethoxysilyl group, a trimethoxysilyl group, and triethoxysilyl group, chlorosilyl groups such as a monochlorosilyl group and a trichlorosilyl group, and bromosilyl groups such as a monobromosilyl group. The bonds between the modifying organic compounds 4 and the shell layer 3 are siloxane bonds.

In this embodiment, the modifying organic compound 4 has an alkyl chain structure. The alkyl chain structure of the modifying organic compound 4 induces steric hindrance that can prevent condensation reaction of the glass material or the polymer material from occurring near the surface of the shell layer 3 of the semiconductor phosphor nanoparticle 1. Thus, no defects occur in the surface of the shell layer 3 during vitrification or resinification, and the decrease in luminous efficiency of the semiconductor phosphor nanoparticle 1 can be suppressed.

Examples of the alkyl chain structure of the modifying organic compound 4 include n-octyl, n-nonyl, n-undecyl, n-octadecyl, n-dodecyl, and t-butyl. Examples of the modifying organic compound having an alkyl chain combined with a functional group include n-octadecyltrimethoxysilane, n-octyltriethoxysilane, n-docosyltriethoxysilane, n-octadecyldimethylmethoxysilane, n-octadecyltrichlorosilane, n-octadecyldimethylchlorosilane, and t-butyldimethylchlorosilane.

The modifying organic compound may be a monoalkoxy alkylsilane. In a monoalkoxy alkylsilane, the silicon atom is bonded to one oxygen atom. This oxygen atom bonds to the shell layer 3 and forms a siloxane bond. Accordingly, as illustrated in FIG. 2, in a semiconductor phosphor nanoparticle in which a monoalkoxy alkylsilane is used as a modifying organic compound 24, the shell layer 3 and the modifying organic compound 24 are bonded to each other through one siloxane bond and there are no oxygen atoms that react with a glass material or a polymer material. Accordingly, the luminous efficiency of the semiconductor phosphor nanoparticle does not decrease even when the semiconductor phosphor nanoparticle is encapsulated in glass or a resin since no stress is generated near the shell layer 3 and detachment of the modifying organic compound 24 does not occur.

Figure 3:
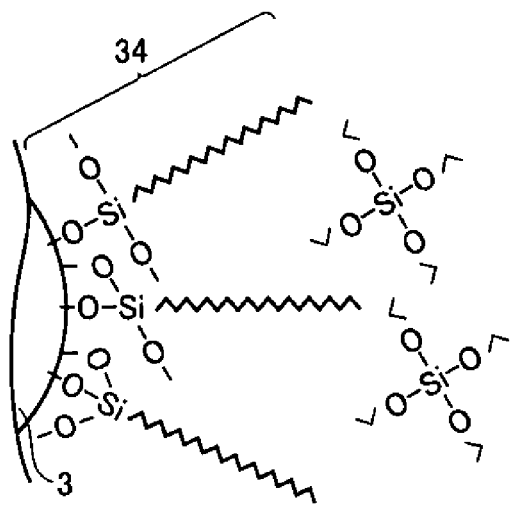
FIG. 3 is a diagram illustrating an example of bonding between a shell layer and a modifying organic compound in a semiconductor phosphor nanoparticle according to an embodiment of the present disclosure.

In contrast, as illustrated in FIG. 3, when the silicon atom of a modifying organic compound 34 is bonded to two or more oxygen atoms, it is possible that the shell layer 3 and the modifying organic compound 34 come to be bonded to each other through two or more siloxane bonds. Moreover, the modifying organic compound 34 contains oxygen atoms that can bond to the glass material or the polymer material in addition to the oxygen atoms that bond to the shell layer 3. Accordingly, when the modifying organic compound 34 is encapsulated in glass or a resin, stress occurs near the shell layer by bonding between the glass material or the polymer material and the oxygen atoms, and it is possible that the modifying organic compound 34 would detach under the stress. Accordingly, a semiconductor phosphor nanoparticle containing the modifying organic compound 34 shown in FIG. 3 possibly exhibits lower luminous efficiency than a semiconductor phosphor nanoparticle that uses a monoalkoxy alkylsilane as a modifying organic compound.

The thickness of the modifying organic compound layer is preferably 0.75 nm or more and more preferably 1 nm or more. When the thickness of the modifying organic compound layer is 0.75 nm, the alkyl chain structure of the modifying organic compound contains a straight-chain structure having 6 or more carbon atoms. When the thickness of the modifying organic compound layer is 1 nm, the alkyl chain structure of the modifying organic compound contains a straight-chain structure having 8 or more carbon atoms.

As long as the modifying organic compound layer has a thickness of 0.75 nm or more, the steric hindrance is increased and the influence of the stress generated by condensation reaction of the glass material or the polymer material can be reduced near the surface of the shell layer 3 during the hardening process of the glass material or the polymer material. As a result, detachment of the modifying organic compounds from the shell layer, in other words, occurrence of defects in the surface of the shell layer 3, caused by the stress can be suppressed, and the decrease in luminous efficiency of the semiconductor phosphor nanoparticle 1 caused by vitrification or resinification can be further suppressed.

Method for Producing Semiconductor Phosphor Nanoparticle

The method for producing a semiconductor phosphor nanoparticle 1 of this embodiment may be any method. From viewpoints of simplicity and cost, a chemical synthesis method may be used to produce the semiconductor phosphor nanoparticle 1. According to a chemical synthesis method, plural starting materials containing elements that constitute the product material are dispersed in a medium and then reaction is conducted to obtain the intended product material. Examples of the chemical synthesis method include a sol-gel method (colloid method), a hot soap method, a reverse micelle method, a solvothermal method, a molecular precursor method, a hydrothermal synthesis method, and a flux method. From the viewpoint of smoothly producing semiconductor nanoparticle cores composed of compound semiconductor materials, a hot soap method may be employed. In the description below, an example of a method for producing a semiconductor phosphor nanoparticle 1 that uses a hot soap method is described.

First, semiconductor nanoparticle cores 2 are prepared by liquid-phase synthesis. In the case where semiconductor nanoparticle cores 2 composed of InN are to be produced, for example, a flask or the like is filled with 1-octadecene (synthetic solvent), and tris(dimethylamino)indium and hexadecanethiol (HDT) are added thereto. The resulting mixture is thoroughly stirred and then allowed to react at 180° C. to 500° C. As a result, semiconductor nanoparticle cores 2 composed of InN are obtained. HDT is bonded to the outer surfaces of the obtained semiconductor nanoparticle cores 2. Alternatively, HDT may be added after growth of shell layers 3.

The synthetic solvent used in the hot soap method may be a compound solution composed of carbon atoms and hydrogen atoms (hereinafter referred to as a hydrocarbon solvent). Since entry of water or oxygen into the synthetic solvent is suppressed, oxidation of the semiconductor nanoparticle cores 2 is avoided. Examples of the hydrocarbon solvent include n-pentane, n-hexane, n-heptane, n-octane, cyclopentane, cyclohexane, cycloheptane, benzene, toluene, o-xylene, m-xylene, and p-xylene.

According to the principle of the hot soap method, the particle size of the semiconductor nanoparticle cores 2 increases as the reaction time extends. Thus, the size of the semiconductor nanoparticle cores 2 can be controlled to a desired size by conducting liquid-phase synthesis while monitoring the particle size through photoluminescence, light absorption, dynamic light scattering, or the like.

Next, a reaction reagent, which is a raw material of the shell layer 3, is added to the solution containing the semiconductor nanoparticle cores 2, and reaction is conducted under heating. As a result, a starting material of semiconductor phosphor nanoparticles is obtained. In the obtained starting material of the semiconductor phosphor nanoparticles, the outer surfaces of the semiconductor nanoparticle cores 2 are coated with the shell layers 3 and HDT is bonded to the outer surfaces of the shell layers 3.

Subsequently, modifying organic compounds 4 are added to the solution containing the starting material of the semiconductor phosphor nanoparticles and reaction is conducted at room temperature to 300° C. As a result, the bonds between the outer surfaces of the shell layers 3 and HDT are released, and the modifying organic compounds 4 bond to the outer surfaces of the shell layers 3. Thus, semiconductor phosphor nanoparticles 1 of this embodiment are obtained.

In preparing the semiconductor nanoparticle cores 2, modifying organic compounds 4 may be added instead of HDT. In the case where semiconductor phosphor nanoparticles 1 are obtained as such, addition of modifying organic compounds 4 after formation of the shell layer 3 is optional.

Second Embodiment

A semiconductor phosphor nanoparticle according to another embodiment of the present disclosure will now be described with reference to FIG. 4.

Figure 4:
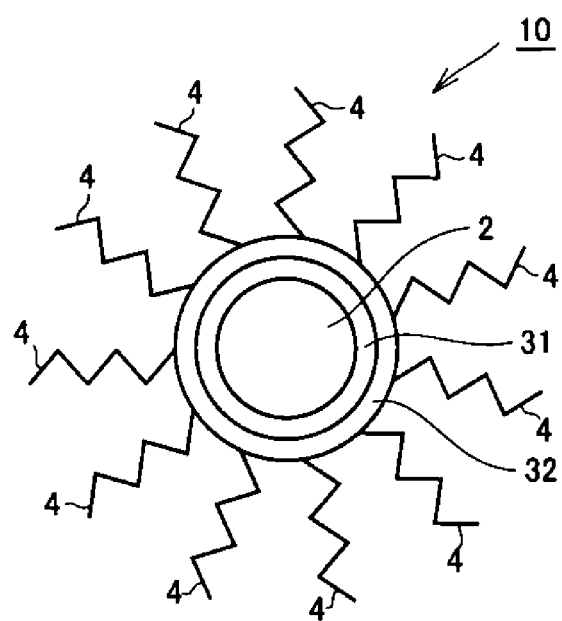
FIG. 4 is a diagram illustrating a semiconductor phosphor nanoparticle according to an embodiment of the present disclosure.

As illustrated in FIG. 4, a semiconductor phosphor nanoparticle 10 includes a semiconductor nanoparticle core 2, a first shell layer 31 coating the semiconductor nanoparticle core 2, a second shell layer 32 coating the first shell layer 31, and modifying organic compounds 4 that bond to the second shell layer 32 through siloxane bonding.

The semiconductor nanoparticle core 2 and the modifying organic compounds 4 may be the same as those of the first embodiment.

The shell layer of the semiconductor phosphor nanoparticle of this embodiment includes two shell layers, namely, the first shell layer 31 and the second shell layer 32. The materials of the shell layers may be selected to further increase the bonding strength between the shell layer and the modifying organic compounds. The number of shell layers may be any. For example, the shell layer may have a multilayer structure constituted by two or more shell layers.

Third Embodiment

A semiconductor phosphor nanoparticle according to another embodiment of the present disclosure will now be described with reference to FIG. 5.

Figure 5:
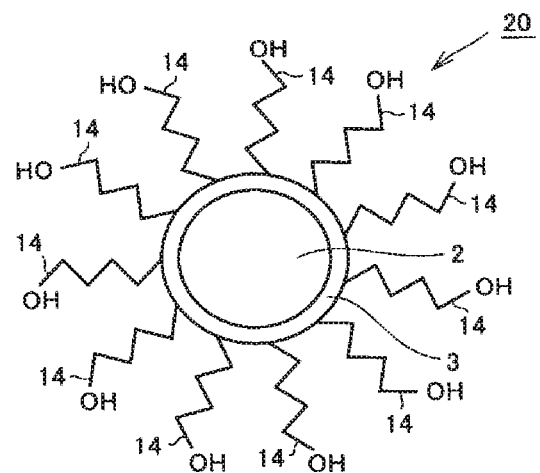
FIG. 5 is a diagram illustrating a semiconductor phosphor nanoparticle according to an embodiment of the present disclosure.
Figure 5:
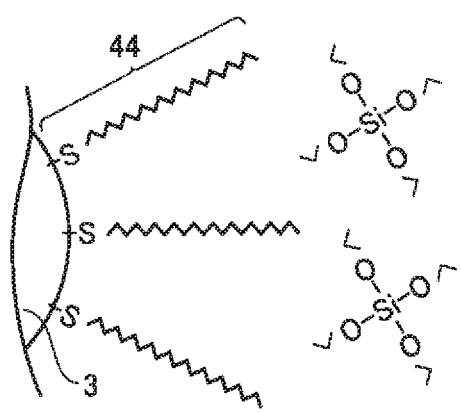

As illustrated in FIG. 5, a semiconductor phosphor nanoparticle 20 includes a semiconductor nanoparticle core 2, a shell layer 3 coating the semiconductor nanoparticle core 2, and modifying organic compounds 14 that bond to the shell layer 3 through siloxane bonding.

The semiconductor nanoparticle core 2 and the shell layer 3 may be the same as those in the first embodiment.

In the semiconductor phosphor nanoparticle 20 of this embodiment, $CH_3$ terminals of the alkyl chains of the modifying organic compounds 14 are transformed into OH groups. OH groups are easily dispersible in glass ($SiO_2$) Thus, the semiconductor phosphor nanoparticles 20 can be encapsulated in glass while being more thoroughly dispersed in the glass material.

The $CH_3$ terminals of the alkyl chains of the modifying organic compounds 14 can be transformed into OH groups by, for example, irradiation with vacuum ultraviolet (VUV) light.

Fourth Embodiment

A light-emitting element according to an embodiment of the present disclosure includes any one of the semiconductor phosphor nanoparticles of the first to third embodiments, and a transparent member. The semiconductor phosphor nanoparticles are dispersed in the transparent member. The transparent member may be composed of a glass material or a polymer material. The volume ratio of the semiconductor phosphor nanoparticles to the transparent member may be any value suitable for usage of the light-emitting element and may be 0.000001 or more and 10 or less. When the volume ratio is 0.000001 or more and 10 or less, the semiconductor phosphor nanoparticles are less likely to aggregate and more easily homogeneously dispersed in the transparent member. If the transparency of the light-emitting element is desirable, the volume ratio of the semiconductor phosphor nanoparticles to the transparent member is preferably 0.2 or less and more preferably 0.1 or less. As long as the volume ratio is 0.2 or less, a light-emitting element with high transparency can be obtained. When the volume ratio is 0.1 or less, a light-emitting element with higher transparency can be obtained. If the amount of luminescence from the light-emitting element is to be focused, the volume ratio of the semiconductor phosphor nanoparticles to the transparent member may be 0.00001 or more. When the volume ratio is 0.00001 or more, a light-emitting element with a large amount of luminescence can be obtained.

The transparent member may be composed of a glass material or a polymer material. The transparent member preferably contains 80% by volume or more and more preferably contains 90% by volume or more of a glass material or a polymer material. As long as the transparent member contains 80% by volume or more of the glass material or the polymer material, a light-emitting element having high transparency or high efficiency can be obtained. When the ratio is 90% by volume or more, a light-emitting element having higher transparency or higher efficiency can be obtained.

Encapsulating Semiconductor Phosphor Nanoparticles in Transparent Member

In encapsulating the semiconductor phosphor nanoparticles 1 in a transparent member, the semiconductor phosphor nanoparticles 1 are first dispersed in the transparent member and then a hardening process is performed.

Examples of the glass material that can be used include tetramethoxysilane (TMOS), tetraethoxysilane (TEOS), tetrapropoxysilane, and tetrabutoxysilane. The glass material hardens as the condensation reaction proceeds. Heating may be performed or an acid or a base may be added to the system in order to accelerate the progress of the condensation reaction. The semiconductor phosphor nanoparticles 1 can be dispersed in the glass material by, for example, stirring a solution containing a glass material and phosphor nanoparticles.

Examples of the polymer material that can be used include acrylic resins such as polymethyl methacrylate (PMMA) and epoxy resins such as those prepared from bisphenol A and epichlorohydrin. The polymer material cures (hardens) as the condensation reaction proceeds, and turns into a resin (solidification). Curing can be performed by an optical curing method with which UV light is applied to induce curing or a heat curing method with which heat is applied to induce curing.

EXAMPLES

The present disclosure will now be described in further detail through Examples which do not limit the scope of the present disclosure.

In the description below, the notation A/B means that A is coated with B.

Example 1

Production of Semiconductor Phosphor Nanoparticles

A toluene solution of semiconductor phosphor nanoparticles each constituted by a semiconductor nanoparticle core composed of InP, a shell layer composed of ZnS, and a modifying organic compound layer composed of hexadecanethiol (HDT) was prepared.

Next, 5 equivalents of n-octadecyltrimethoxysilane (ODTMS) serving as a new modifying organic compound relative to 1 equivalent of the semiconductor phosphor nanoparticles 1 was added to the semiconductor phosphor nanoparticle toluene solution. ODTMS was allowed react with the semiconductor phosphor nanoparticles at 70° C. for 3 hours in a nitrogen atmosphere so as to remove HDT from the shell layer and bond ODTMS to the shell layer.

Subsequently, HDT dissociated from the shell layer and unreacted ODTMS were removed from the system by washing the system with an organic solvent. Drying was then conducted, and InP/ZnS/ODTMS semiconductor phosphor nanoparticles illustrated in FIG. 1 in which the modifying organic compounds 4 were ODTMS were obtained.

The semiconductor phosphor nanoparticles were dispersed in tetraethoxysilane (TEOS) and a hardening process was conducted to encapsulate the nanoparticles in the glass so as to prepare glass-encapsulated semiconductor phosphor nanoparticles. The volume ratio of the semiconductor phosphor nanoparticles to TEOS was 5:10000.

Evaluation of Performance

The intensity of the fluorescence generated when the glass-encapsulated semiconductor phosphor nanoparticles were induced to absorb excited light with a wavelength of 450 nm was measured. The ratio of the number of luminescent photons to the number of absorbed photons was assumed to be the luminous efficiency.

Results of Evaluation

The glass-encapsulated semiconductor phosphor nanoparticles of Example 1 maintained high luminous efficiency. The reason for this is presumably as follows.

In the semiconductor phosphor nanoparticles of Example 1, the bonds between the shell layer and the modified organic compounds are siloxane bonds having high bonding strength. Thus, dissociation of siloxane bonds is suppressed despite stress generated during the glass encapsulation process. As a result, the semiconductor phosphor nanoparticles of Example 1 can suppress the decrease in luminous efficiency.

Example 2

Production of Semiconductor Phosphor Nanoparticles

Semiconductor phosphor nanoparticles were prepared as in Example 1 except that n-octadecyldimethylmethoxysilane (ODMMS) was used instead of ODTMS as the modifying organic compound and that the reaction conditions for forming the modifying organic compound layer were changed to 90° C. and 3 hours. The semiconductor phosphor nanoparticles obtained were InP/ZnS/ODMMS semiconductor phosphor nanoparticles illustrated in FIG. 1 in which the modifying organic compounds 4 were ODMMS.

The semiconductor phosphor nanoparticles were dispersed in tetraethoxysilane (TEOS) and encapsulated in glass by performing a hardening treatment so as to prepare glass-encapsulated phosphor nanoparticles. The volume ratio of the semiconductor phosphor nanoparticles to TEOS was 5:10000.

Evaluation of Performance

Performance was evaluated as in Example 1.

Results of Evaluation

The glass-encapsulated semiconductor phosphor nanoparticle of Example 2 had higher luminous efficiency than the glass-encapsulated semiconductor phosphor nanoparticles of Example 1. The reason for this is presumably as follows.

In a semiconductor phosphor nanoparticle of Example 1, as illustrated in FIG. 3, the silicon atom constituting a siloxane bond between the shell layer 3 and the modifying organic compound 34 is bonded to one to three oxygen atoms. The oxygen atoms can bond to the shell layer 3 and the glass material. Accordingly, oxygen atoms other than those bonded to the shell layer 3 may react with the glass material during the process of dispersing the semiconductor phosphor nanoparticles in the glass material and vitrifying the glass material. The reaction between the oxygen atoms and the glass material generates stress near the shell layer 3 and causes detachment of the modifying organic compounds 34 from the shell layer 3, thereby decreasing the luminous efficiency of the semiconductor phosphor nanoparticle.

Figure 2:
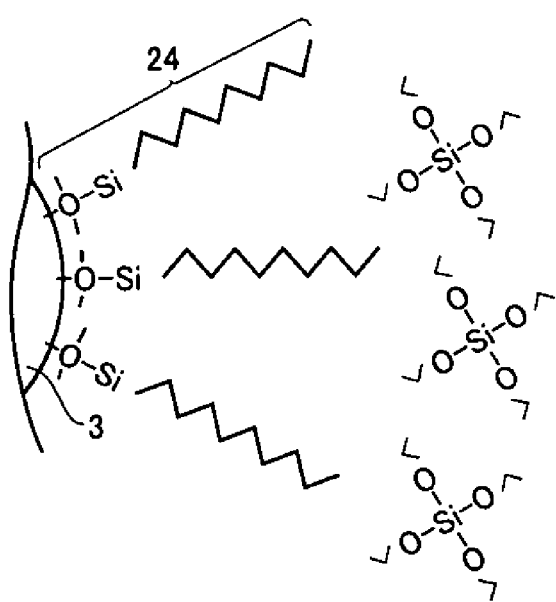
FIG. 2 is a diagram illustrating an example of bonding between a shell layer and a modifying organic compound in a semiconductor phosphor nanoparticle according to an embodiment of the present disclosure.

In contrast, in a semiconductor phosphor nanoparticle of Example 2, as illustrated in FIG. 2, the silicon atom constituting a siloxane bond between the shell layer 3 and the modifying organic compound 24 is bonded to one oxygen atom. Since the oxygen atom is bonded to the shell layer 3, the glass material does not bond to the modifying organic compounds 24 near the shell layer. Accordingly, no stress is generated near the shell layer 3 and detachment of the modifying organic compound 24 from the shell layer 3 does not occur during the process of dispersing the semiconductor phosphor nanoparticles in the glass material and vitrifying the glass material. Thus the luminous efficiency is maintained.

Example 3

Production of Semiconductor Phosphor Nanoparticles

Semiconductor phosphor nanoparticles were prepared as in Example 1 except that n-hexyltrimethoxysilane (HTMS) was used as the modifying organic compound instead of ODTMS and that the reaction conditions for forming the modifying organic compound layer were changed to 50° C. and 3 hours. The semiconductor phosphor nanoparticles obtained were InP/ZnS/HTMS semiconductor phosphor nanoparticles illustrated in FIG. 1 in which the modifying organic compounds 4 were HTMS.

The semiconductor phosphor nanoparticles were dispersed in tetraethoxysilane (TEOS) and encapsulated in glass by conducting a hardening process. As a result, glass-encapsulated semiconductor phosphor nanoparticles were prepared. The volume ratio of the semiconductor phosphor nanoparticles to TEOS was 5:10000.

Evaluation of Performance

Performance was evaluated as in Example 1.

Results of Evaluation

According to the glass-encapsulated semiconductor phosphor nanoparticles of Example 3, the decrease in luminous efficiency was suppressed but the luminous efficiency was lower than that of the glass-encapsulated semiconductor phosphor nanoparticles of Example 1. The reason for this is presumably as follows.

The semiconductor phosphor nanoparticle of Example 1 and the semiconductor phosphor nanoparticle of Example 3 differ from each other in the length of the alkyl main chain of the modifying organic compound. That is, the number of carbon atoms is 18 in Example 1 whereas the number of carbon atoms is 6 in Example 3. Since the alkyl chain of the modifying organic compound used in Example 3 is short, the reaction between the shell layer and the modifying organic compound proceeds smoothly during the process of forming the modifying organic compound layer and a semiconductor phosphor nanoparticle can be prepared at a lower temperature condition. However, in the semiconductor phosphor nanoparticle of Example 3, the thickness of the modifying organic compound layer is less than one half of that of Example 1. Accordingly, although separation of the modifying organic compound by stress generated during glass encapsulation or resin encapsulation is suppressed due to strong bonds between the modifying organic compound and the shell layer, the position where stress is generated may be closer to the surface of the shell layer than in Example 1.

In other words, when a silane-based modifying agent having a short alkyl chain is used as a modifying organic compound as in Example 3, a semiconductor phosphor nanoparticle can be produced under mild conditions. However, in the semiconductor phosphor nanoparticle of Example 3, stress is likely to be generated near the surface of the shell layer during the process of glass encapsulation or resin encapsulation. Thus, although the decrease in luminous efficiency of the semiconductor phosphor nanoparticle of Example 3 can be suppressed between before and after encapsulation compared to a known semiconductor phosphor nanoparticle that does not use a modifying organic compound for protection, the effect of suppressing the decrease in luminous efficiency between before and after encapsulation is smaller than the semiconductor phosphor nanoparticle that has a long alkyl chain as described in Example 1.

Example 4

Production of Semiconductor Phosphor Nanoparticles

A toluene solution of phosphor nanoparticles each constituted by a semiconductor nanoparticle core composed of InN, a first shell layer composed of InGaN, a second shell layer composed of ZnO, and a modifying organic compound layer composed of hexadecanethiol (HDT) was prepared.

Then 5 equivalents of ODTMS serving as a new modifying organic compound relative to 1 equivalent of the semiconductor phosphor nanoparticles 1 was added to the toluene solution of the semiconductor phosphor nanoparticles. In a nitrogen atmosphere, ODTMS was allowed to react with the semiconductor phosphor nanoparticles at 70° C. for 3 hours to remove HDT from the second shell layer and bond ODTMS to the second shell layer.

HDT dissociated from the shell layer and unreacted ODTMS were removed from the system by performing washing with an organic solvent. Drying was then performed and as a result, InN/InGaN/ZnO/ODTMS semiconductor phosphor nanoparticles 10 illustrated in FIG. 4 in which ODTMS was used as the modifying organic compounds 4 were obtained.

The semiconductor phosphor nanoparticles were dispersed in tetraethoxysilane (TEOS) and encapsulated in glass by performing a hardening treatment. As a result, glass-encapsulated semiconductor phosphor nanoparticles were prepared. The volume ratio of the semiconductor phosphor nanoparticles to TEOS was 10:10000.

Evaluation of Performance

Performance was evaluated as in Example 1.

Results of Evaluation

The glass-encapsulated semiconductor phosphor nanoparticles of Example 4 maintained high luminous efficiency.

Example 5

Production of Semiconductor Phosphor Nanoparticles

InP/ZnS/ODTMS semiconductor phosphor nanoparticles the same as those in Example 1 were obtained by the same method as in Example 1. The semiconductor phosphor nanoparticles were irradiated with light from a 172 nm excimer lamp. The presence of OH groups was confirmed in $^1$H NMR measurement of these phosphor nanoparticles.

The semiconductor phosphor nanoparticles were dispersed in tetraethoxysilane (TEOS) and encapsulated in glass by performing a hardening treatment. As a result, glass-encapsulated semiconductor phosphor nanoparticles were obtained. The volume ratio of the semiconductor phosphor nanoparticles to TEOS was 2:10000.

Evaluation of Performance

Performance was evaluated as in Example 1.

Results of Evaluation

The glass-encapsulated semiconductor phosphor nanoparticles of Example 5 maintained high luminous efficiency. The semiconductor phosphor nanoparticles of Example 5 had high dispersibility in the glass material. The reason for this is presumably as follows.

When the semiconductor phosphor nanoparticles of Example 5 are irradiated with vacuum ultraviolet (VUV) light, $CH_3$ terminals of the alkyl chains of the modifying organic compounds 14 are transformed into other functional groups such as OH groups as illustrated in FIG. 5. Since OH groups have high dispersibility in glass ($SiO_2$), the semiconductor phosphor nanoparticles can be more thoroughly dispersed in the glass material.

Example 6

Production of Semiconductor Phosphor Nanoparticles

A toluene solution of semiconductor phosphor nanoparticles each constituted by a semiconductor nanoparticle core composed of InP, a shell layer composed of ZnS, and a modifying organic compound layer composed of hexadecanethiol (HDT) was prepared.

Then HDT dissociated from the shell layer was removed by washing with an organic solvent. Then drying was performed so as to obtain InP/ZnS/HDT semiconductor phosphor nanoparticles in which the modifying organic compound layer was composed of HDT.

The phosphor nanoparticles were dispersed in tetraethoxysilane (TEOS) and encapsulated in glass by performing a hardening treatment. As a result, glass-encapsulated phosphor nanoparticles were obtained. The volume ratio of the semiconductor phosphor nanoparticles to TEOS was 5:10000.

Evaluation of Performance

Performance was evaluated as in Example 1.

Results of Evaluation

The glass-encapsulated semiconductor phosphor nanoparticles of Example 6 had lower luminous efficiency than the glass-encapsulated semiconductor phosphor nanoparticles of Example 1. The reason for this is presumably as follows.

As illustrated in FIG. 6, in a semiconductor phosphor nanoparticle of Example 6, the bond between a shell layer 3 and a modifying organic compound 44 is a thiol bond with low bonding strength. Thus, in performing a glass encapsulation process, stress caused by condensation reaction of the glass material breaks the thiol bond and the modifying organic compound dissociates from the shell layer. As a result, the glass-encapsulated semiconductor phosphor nanoparticles of Example 6 exhibits low luminous efficiency.

All aspects of the embodiments and examples disclosed herein are merely illustrative and not limiting. The scope of the disclosure is defined not by the embodiments described above but by claims, and is intended to include equivalents of the claims and all modifications and alterations within the scope.

The present disclosure contains subject matter related to that disclosed in Japanese Priority Patent Application JP 2014-217175 filed in the Japan Patent Office on Oct. 24, 2014, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A semiconductor phosphor nanoparticle comprising:
    a semiconductor nanoparticle core including a compound semiconductor;
    a shell layer coating the semiconductor nanoparticle core; and
    a modifying organic compound bonded to the shell layer through siloxane bonding, the modifying organic compound having an alkyl chain, wherein
    a terminal of the alkyl chain of the modifying organic compound is a hydroxyl group.

2. The semiconductor phosphor nanoparticle according to claim 1, wherein the modifying organic compound is bonded to the shell layer through one siloxane bond.

3. The semiconductor phosphor nanoparticle according to claim 1, wherein the modifying organic compound is monoalkoxy alkylsilane.

4. The semiconductor phosphor nanoparticle according to claim 1, wherein the shell layer includes a plurality of shell layers.

5. The semiconductor phosphor nanoparticle according to claim 1, wherein the modifying organic compound forms a modifying organic compound layer having a thickness of 0.75 nm or more.

6. The semiconductor phosphor nanoparticle according to claim 1, wherein the semiconductor nanoparticle core and the shell layer contain a group 13-15 semiconductor.

7. A light-emitting element comprising the semiconductor phosphor nanoparticle according to claim 1.

8. The light-emitting element according to claim 7, further comprising a transparent member, wherein the semiconductor phosphor nanoparticle is dispersed in the transparent member.

9. The light-emitting element according to claim 8, wherein a volume ratio of the semiconductor phosphor nanoparticle to the transparent member is 0.00001 or more and 0.2 or less.

10. The light-emitting element according to claim 8, wherein the transparent member contains 80% by mass or more of a glass material or a polymer material.

* * * * *